US011474058B2

(12) United States Patent
Nalladega et al.

(10) Patent No.: US 11,474,058 B2
(45) Date of Patent: Oct. 18, 2022

(54) SYSTEMS AND METHODS FOR DETECTING WATER IN A FAN CASE

(71) Applicant: General Electric Company, Schenectady, NY (US)

(72) Inventors: Venkata Vijayaraghava Nalladega, Watervliet, NY (US); Charles Joseph Geiger, West Chester, OH (US); Bernard Patrick Bewlay, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 953 days.

(21) Appl. No.: 16/244,962

(22) Filed: Jan. 10, 2019

(65) Prior Publication Data

US 2020/0225178 A1   Jul. 16, 2020

(51) Int. Cl.
| | | |
|---|---|---|
| *G01N 25/72* | (2006.01) | |
| *F04D 29/40* | (2006.01) | |
| *G06T 5/20* | (2006.01) | |
| *G06T 7/00* | (2017.01) | |

(52) U.S. Cl.
CPC ............ *G01N 25/72* (2013.01); *F04D 29/40* (2013.01); *G06T 5/20* (2013.01); *G06T 7/0004* (2013.01); *G06T 2207/10048* (2013.01)

(58) Field of Classification Search
CPC ........... G01N 25/72; F04D 29/40; G06T 5/20; G06T 7/0004; G06T 2207/10048
See application file for complete search history.

(56) References Cited

U.S. PATENT DOCUMENTS

| | | | |
|---|---|---|---|
| 4,647,220 | A | 3/1987 | Adams et al. |
| 7,199,367 | B2 | 4/2007 | Favro et al. |
| 8,294,104 | B2 | 10/2012 | Dis Santos et al. |
| 9,004,753 | B1 | 4/2015 | Maresca, Jr. et al. |
| 9,811,900 | B2 | 11/2017 | Maresca, Jr. et al. |
| 2006/0114965 | A1 | 6/2006 | Murphy et al. |

(Continued)

FOREIGN PATENT DOCUMENTS

| | | | |
|---|---|---|---|
| CN | 104373191 A | * 2/2015 | ............. F01P 11/06 |
| CN | 108811448 A | * 11/2018 | |

(Continued)

OTHER PUBLICATIONS

Matzkanin et al., "Nondestructive Evaluation Techniques for Detecting Hidden Corrosion", The AMMTIAC Quarterly, Jan. 2008, pp. 3-6. vol. 2, AMMTIAC, Austin, TX.

(Continued)

*Primary Examiner* — Gail Kaplan Verbitsky
(74) *Attorney, Agent, or Firm* — Fitch, Even, Tabin & Flannery LLP

(57) ABSTRACT

A detection system configured to detect water in a fan case includes a heater, a monitoring camera, and a computing device. The heater is configured to apply heat to the fan case. Any water within the fan case generates a local transient thermal gradient in response to the applied heat. The monitoring camera is positioned proximate the fan case and configured to acquire a plurality of images of the heated fan case. The computing device is configured to: receive the plurality of images from the monitoring camera and analyze the plurality of images to detect the water in the fan case.

20 Claims, 6 Drawing Sheets

(56) References Cited

U.S. PATENT DOCUMENTS

| | | |
|---|---|---|
| 2008/0111074 A1 | 5/2008 | Weir et al. |
| 2016/0328835 A1 | 11/2016 | Maresca, Jr. et al. |
| 2017/0336328 A1 | 11/2017 | Gupta et al. |

FOREIGN PATENT DOCUMENTS

| | | | | |
|---|---|---|---|---|
| EP | 1980847 | A2 | | 10/2008 |
| EP | 3206021 | A1 | | 8/2017 |
| JP | H0178809 | A | * | 1/1989 |
| JP | H06117247 | A | * | 6/1994 |
| JP | H07229867 | A | * | 8/1995 |
| JP | 2014/002073 | A | | 1/2014 |

OTHER PUBLICATIONS

A. Capka et al., "Detecting Water in Composite Sandwich Panels by Using Infrared Thermography", Materials Science Forum, 2017, pp. 516-521, vol. 891. Trans Tech Publications, Switzerland.
Bagavathiappan et al., "Infrared Thermography for Condition Monitoring", Infrared Physics & Technology, Sep. 2013, pp. 35-55, vol. 60.
Khan et al., "Non-destructive Testing Applications in Commercial Aircraft Maintenance", Aerospace, Jun. 1999, pp. 6, vol. 4.
European Search Report Corresponding to Application No. 20150559 dated Jun. 29, 2020.

* cited by examiner

SYSTEMS AND METHODS FOR DETECTING WATER IN A FAN CASE

BACKGROUND

The field of the disclosure relates generally to detection systems, and more particularly, to systems and methods for detecting water in fan cases on aircraft engines.

At least some aircraft engines include a fan case configured to channel air into the engine. The fan case is typically constructed of an aluminum alloy and typically includes a plurality of liners. Specifically, the fan case may include at least one acoustic liner positioned adjacent a plurality of fan blades and an abradable liner structure positioned between a tip of the fan blades and an inside surface of the fan case. During operation of the aircraft engine, water can penetrate between the abradable liner and/or the acoustic liner and the fan case. The water may include corroding species, such as salts, and the corroding species may cause corrosion damage to the fan case. Fan cases are typically large structures, and inspecting the fan case for corrosion typically includes removing the fan case from the engine and manually inspecting the fan case for corrosion. Removing the fan case from the engine to inspect for corrosion is labor intensive, increases the downtime of the engine, and increases the cost of operating the engine.

BRIEF DESCRIPTION

In one aspect, a detection system configured to detect water in a fan case is provided. The detection system includes a heater, a monitoring camera, and a computing device. The heater is configured to apply heat to the fan case. Any water within the fan case generates a local transient thermal gradient in response to the applied heat. The monitoring camera is positioned proximate the fan case and configured to acquire a plurality of images of the heated fan case. The computing device is configured to: receive the plurality of images from the monitoring camera and analyze the plurality of images to detect the water in the fan case.

In another aspect, a detection system configured to detect water in a fan case of a gas turbine engine is provided. The gas turbine engine includes a plurality of fan blades and the fan case circumscribes the plurality of fan blades. The detection system includes a heater, a monitoring camera system, and a computing device. The heater is configured to apply heat to the fan case. Any water within the fan case generates a local transient thermal gradient in response to the applied heat. The monitoring camera system is attached to a fan blade of the plurality of fan blades and is configured to acquire a plurality of images of the heated fan case. The computing device is configured to: receive the plurality of images from the monitoring camera and analyze the plurality of images to detect the water in the fan case.

In yet another aspect, a method of detecting water in a fan case is provided. The method includes heating at least one surface of the fan case with a heater. Any water within the fan case generates a local transient thermal gradient in response to the applied heat. The method also includes acquiring a plurality of images of the at least one surface using a monitoring camera. The method further includes analyzing the plurality of images of the at least one surface using a computing device to detect water in the fan case.

DRAWINGS

These and other features, aspects, and advantages of the present disclosure will become better understood when the following detailed description is read with reference to the accompanying drawings in which like characters represent like parts throughout the drawings, wherein.

Figure 1:
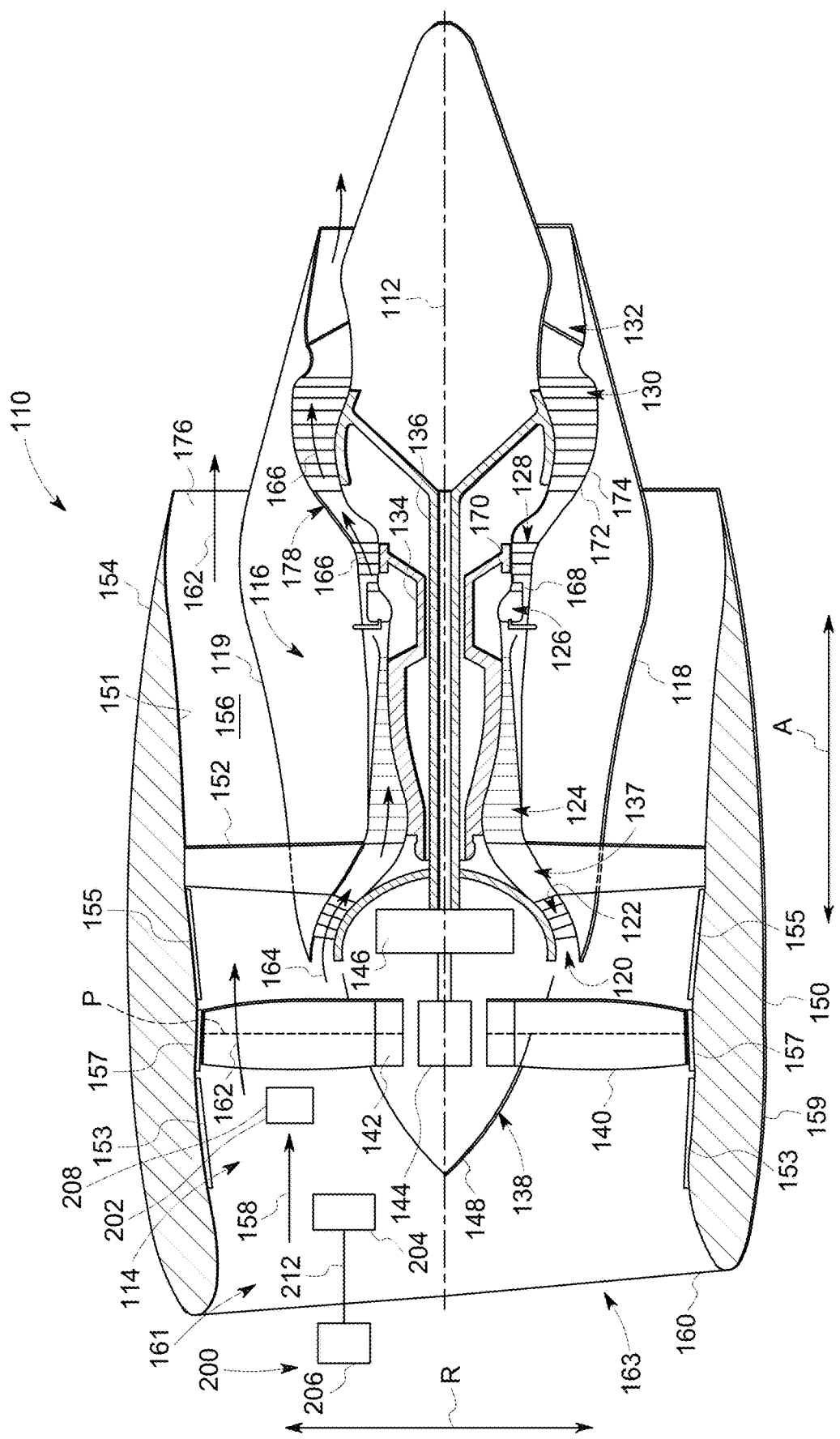
FIG. 1 is a schematic view of an exemplary aircraft engine with a fan case and a detection system in a first detection configuration.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer" and related terms, e.g., "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

Embodiments of the detection systems described herein detect water entrained within a fan case of a gas turbine engine. The fan case includes a plurality of liners on an inner surface of the fan case. During operations, water from the ambient air may penetrate between the liners and the fan case and entrain water behind the liners. The water may include corroding species, such as salt, and may eventually cause corrosion within the fan case. The detection system is configured to detect the entrained water without removing the liners. The detection system includes a heater, a monitoring camera, and a computing device. The heater is configured to heat the fan case such that a local transient thermal gradient is created. Specifically, because water absorbs heat at a different rate than the fan case, a local transient thermal gradient is created where the water is entrained behind the liners. That is, a heating rate of regions of the fan case with water is different than a heating rate of regions of the fan case without water, and the detection system is configured to detect the gradient of the heating rate with respect to time of the fan case. Specifically, the monitoring camera is an infrared camera configured to image the liners and/or the fan case. The monitoring camera acquires a plurality of images of an inner radial surface of the fan case, and the local temperature gradients appear as light or dark spots on the images. The images are sent to the computing device where image processing software analyzes the images to determine if water is entrained behind the liners. The computing device then alerts the operator of the potential presence of entrained water. The detection system reduces inspection costs by detecting entrained water without removing the liners from the fan case and/or removing the fan case from the engine. As such, the labor cost of inspecting the fan case is reduced by using the detection system to detect water rather than removing the liners from the fan case. Additionally, the detection system also reduces operating costs of the gas turbine engine by reducing downtime because the fan case and the liners are not removed from the engine.

Figure 2:
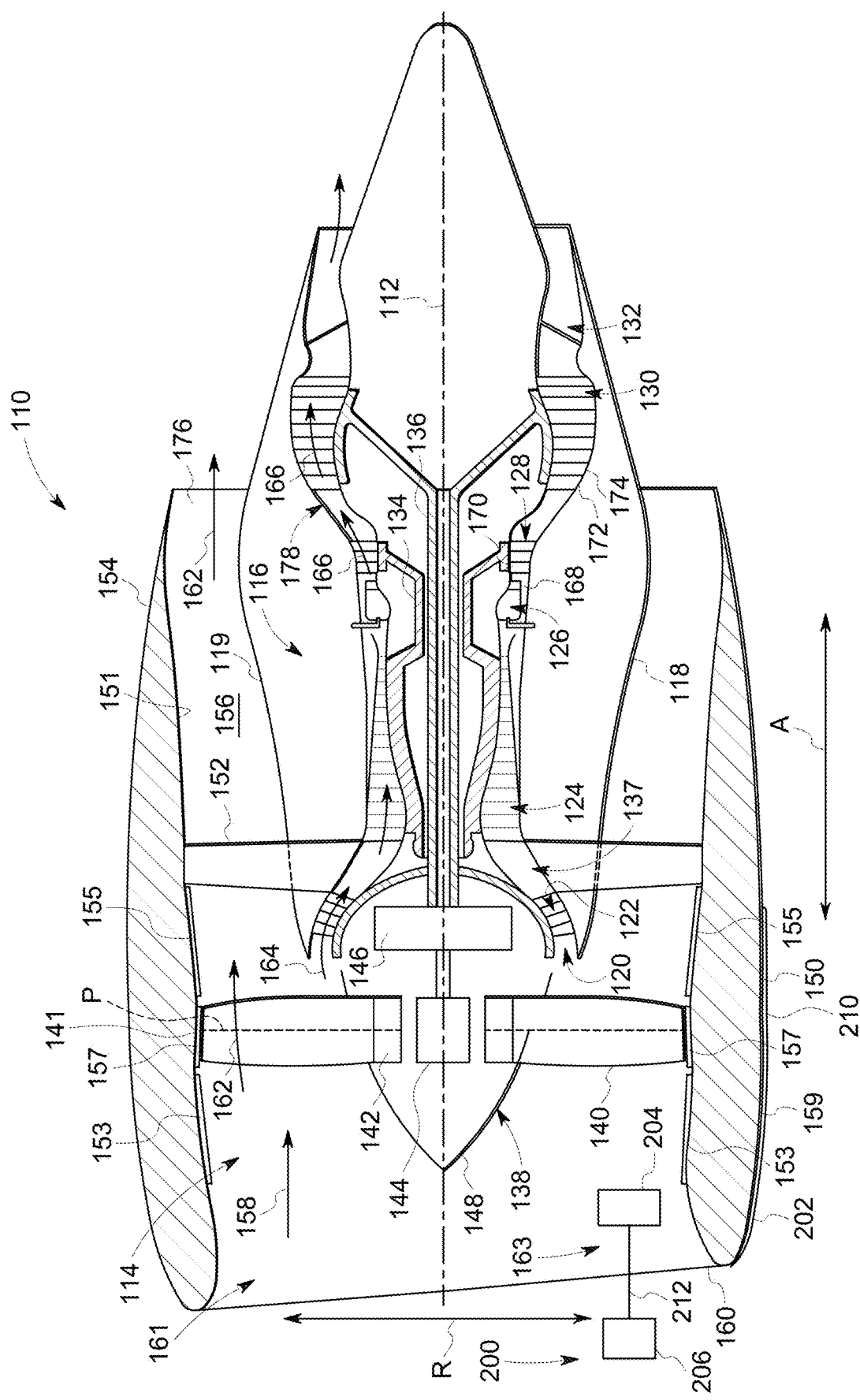
FIG. 2 is a schematic view of the exemplary aircraft engine shown in FIG. 1 with the fan case and the detection system in a second detection configuration.

FIG. 1 is a schematic cross-sectional view of a gas turbine engine 110 in accordance with an exemplary embodiment of the present disclosure with a detection system 200 and a fan case 150 in a first detection configuration. FIG. 2 is a schematic cross-sectional view of gas turbine engine 110 in accordance with an exemplary embodiment of the present disclosure with detection system 200 and fan case 150 in a second detection configuration. In the example embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

It should be appreciated, however, that exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Exemplary core turbine engine 116 depicted generally includes a substantially tubular outer casing 118 that defines an annular inlet 120. Outer casing 118 includes an outer radial surface 119. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A spool or high pressure (HP) shaft 134 drivingly connects HP turbine 128 to HP compressor 124. A spool or low pressure (LP) shaft 136 drivingly connects LP turbine 130 to LP compressor 122. The compressor section, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R and include a tip 141. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. In the illustrated embodiment, fan blades 140, disk 142, and pitch change mechanism 144 are together rotatable about longitudinal centerline 112 by LP shaft 136 across a power gear box 146. Power gear box 146 includes a plurality of gears for adjusting the rotational speed of fan 138 relative to LP shaft 136 to a more efficient rotational fan speed. In an alternative embodiment, turbofan engine 110 does not include power gear box 146. Rather, fan blades 140, disk 142, and pitch change mechanism 144 are directly coupled to LP shaft 136 and are together rotatable about longitudinal centerline 112 by LP shaft 136.

Referring still to the exemplary embodiment of FIG. 1, disk 142 is covered by rotatable front hub 148 aerodynamically contoured to promote an airflow through plurality of fan blades 140. Additionally, exemplary fan section 114 includes fan case 150 that circumferentially surrounds fan 138 and/or at least a portion of core turbine engine 116. It should be appreciated that fan case 150 may be configured to be supported relative to core turbine engine 116 by a plurality of circumferentially-spaced outlet guide vanes 152. Moreover, a downstream section 154 of fan case 150 may extend over an outer portion of core turbine engine 116 so as to define a bypass airflow passage 156 therebetween.

Fan case 150 is typically constructed of a metal, specifically an aluminum alloy. Fan case 150 includes an inner radial surface 151, a plurality of liners 153, 155, and 157 attached to inner radial surface 151, and an outer radial surface 159 opposite inner radial surface 151. Specifically, fan case includes a plurality of forward acoustic liners 153, a plurality of aft acoustic liners 155, and a plurality of abradable liners 157. Forward acoustic liners 153 are positioned upstream of fan section 114 in axial direction A, and aft acoustic liners 155 are positioned downstream of fan section 114 in axial direction A. Abradable liners 157 are positioned between forward acoustic liners 153 and aft acoustic liners 155 and between tip 141 of fan blades 140 and fan case 150. Acoustic liners 153 and 155 are configured to dampen or reduce noise generated by turbofan engine 110, specifically fan section 114. Fan blades 140 are configured to cut into abradable liners 157 to control tolerances around fan blades 140.

During operation of turbofan engine 110, a volume of air 158 enters turbofan engine 110 through an associated inlet 160 of fan case 150 and/or fan section 114. As volume of air 158 passes across fan blades 140, a first portion of volume of air 158 as indicated by arrows 162 is directed or routed into bypass airflow passage 156 and a second portion of volume of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 and HP turbine rotor blades 170. HP turbine stator vanes 168 are coupled to outer casing 118. HP turbine rotor blades 170 are coupled to HP shaft or spool 134. Rotation of HP turbine rotor blades 170 causes HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 and LP turbine rotor blades 174. LP turbine stator vanes 172 are coupled to outer casing 118. LP turbine rotor blades 174 are coupled to LP shaft or spool 136. Rotation of LP turbine rotor blades 174 causes LP shaft or spool 136 to rotate, thereby supporting operation of LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

During operation, volume of air 158 may include water which, in turn, may include corroding species, such as, but not limited to, salts. The water and salts within volume of air 158 may penetrate between liners 153, 155, and 157 and fan case 150 and may corrode or otherwise damage the aluminum alloy of fan case 150. If fan case 150 is damaged due to water and salt within volume of air 158, fan case 150 may need to be repaired and/or replaced. After turbofan engine 110 has been turned off, detection system 200 is positioned proximate liners 153, 155, and 157 to detect water entrained between liners 153, 155, and 157 and fan case 150.

Detection system 200 is configured to detect water between liners 153, 155, and 157 and fan case 150 before the entrained water causes corrosion. Once detection system 200 detects the entrained water, detection system 200 alerts an operator to take the appropriate corrective action. As such, detection system 200 reduces operating cost of turbofan engine 110 by avoiding and/or reducing costly repairs. Additionally, detection system 200 is configured to be portable such that detection system 200 can easily be deployed to detect water between liners 153, 155, and 157 and fan case 150. In some instances a solo operator can inspect the entire fan case 150 using detection system 200. While detection of entrained water does not necessarily indicate that corrosion and/or other damage to fan case 150 has occurred, the detection of entrained water does indicate where there is an increased likelihood for corrosion and/or other damage to occur. As such, because entrainment of water is typically a precursor to corrosion and/or other damage, detection system 200 decreases the likelihood of corrosion by detecting the entrained water before corrosion and/or other damage has occurred. Additionally, as described below, detection system 200 is configured to detect entrained water without removing liners 153, 155, and 157. As such, detection system 200 reduces inspection labor cost and the downtime of turbofan engine 110 by detecting water without removing liners 153, 155, and 157. Accordingly, detection system 200 provides a portable, cost effective method for detecting entrained water that detects water before corrosion and/or other damage has occurred.

Detection system 200 includes a heater 202, a monitoring camera 204, and a computing device 206. In the exemplary embodiment, heater 202 is configured to create a thermal transition within fan case 150 such that water entrained between liners 153, 155, and 157 and fan case 150 changes temperature at a different rate than fan case 150 and/or liners 153, 155, and 157. Specifically, water and aluminum alloys absorb and desorb heat at different rates. When fan case 150 and/or liners 153, 155, and 157 are heated with heater 202, fan case 150 and/or liners 153, 155, and 157 will absorb the heat at different heat rates such that a temperature of fan case 150 and/or liners 153, 155, and 157 increases to a first transient temperature. In contrast, water entrained between fan case 150 and liners 153, 155, and 157 absorbs the heat at different heat rates such that a temperature of the water increases to a second transient temperature different than the first transient temperature. The temperature difference between the first transient temperature and the second transient temperature causes a portion of fan case 150 and/or liners 153, 155, and 157 covering the entrained water to have a third transient temperature different than the first and second transient temperatures. Specifically, the heating rate and/or cooling rate of the portions of fan case 150 and/or liners 153, 155, and 157 covering the entrained water have different heating or cooling rates, in comparison with portions of fan case 150 and/or liners 153, 155, and 157 without entrained water. As such, heater 202 is configured to heat fan case 150 and/or liners 153, 155, and 157 such that the entrained water generates a local transient thermal gradient, or a gradient of the heating rate with respect to time, on fan case 150 and/or liners 153, 155, and 157 that is detectable by monitoring camera 204. The local thermal gradient is transient because, as discussed below, heater 202 only heats fan case 150 and/or liners 153, 155, and 157 for a short period of time. The local thermal gradient quickly dissipates as the heat within the local thermal gradient equilibrates with the surrounding environment. As such, the local thermal gradient created by heater 202 is transient because of how quickly it dissipates. The local thermal gradient created by heater 202 is transient and provides improved detectability of the entrained water. Monitoring camera 204 then images fan case 150 and/or liners 153, 155, and 157 and sends the acquired images to computing device 206 for analysis. Specifically, monitoring camera 204 images fan case 150 and/or liners 153, 155, and 157 such that the acquired images show the local transient thermal gradient generated by heater 202. Computing device 206 is configured to analyze the images and detect the entrained water based on the local transient thermal gradient within the acquired images. Computing device 206 is further configured to alert an operator of entrained water between fan case 150 and liners 153, 155, and 157.

Heater 202 may include a heat lamp 208 (shown in FIG. 1), a heating blanket 210 (shown in FIG. 2), and/or any other heating device that enables detection system 200 to operate as described herein. In the exemplary embodiment, heat lamp 208 is an electrical device typically including a heat lamp bulb configured to emit infrared radiation. In the exemplary embodiment, heating blanket 210 is an electrical device including a flexible material or blanket and at least one heating element attached to, or disposed within, the flexible material and configured to emit infrared radiation. In the exemplary embodiment, heat lamp 208 is configured to heat inner radial surface 151, and heating blanket 210 is configured to heat outer radial surface 159. Specifically, heat lamp 208 is positioned to emit infrared radiation toward inner radial surface 151 as shown in FIG. 1, and heating blanket 210 is positioned or wrapped around outer radial surface 159 such that it emits infrared radiation toward outer radial surface 159 as shown in FIG. 2.

Figure 3:
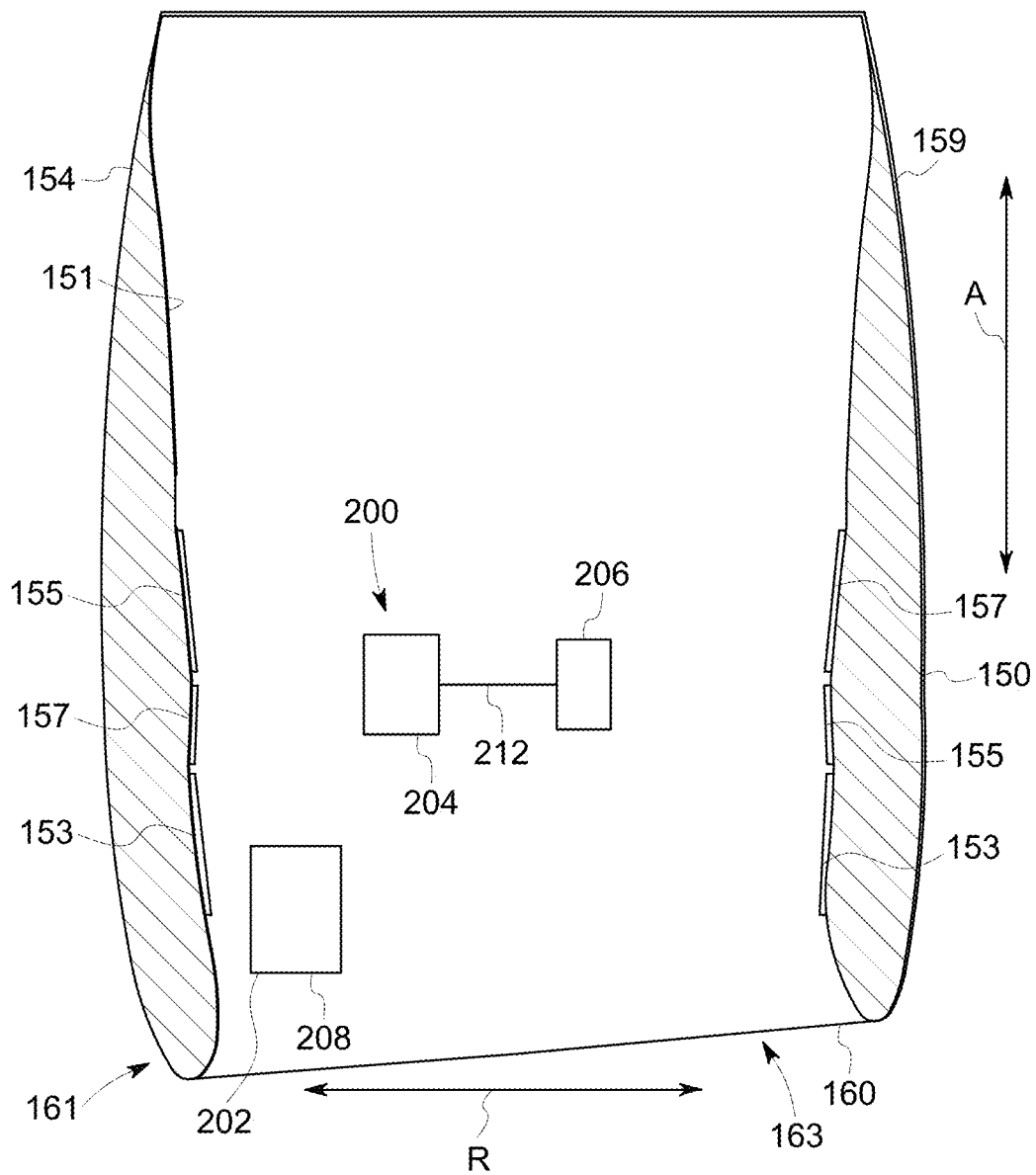
FIG. 3 is a schematic view of an exemplary fan case for use with the exemplary aircraft engine shown in FIG. 1 with the fan case and the detection system in a third detection configuration.
Figure 4:
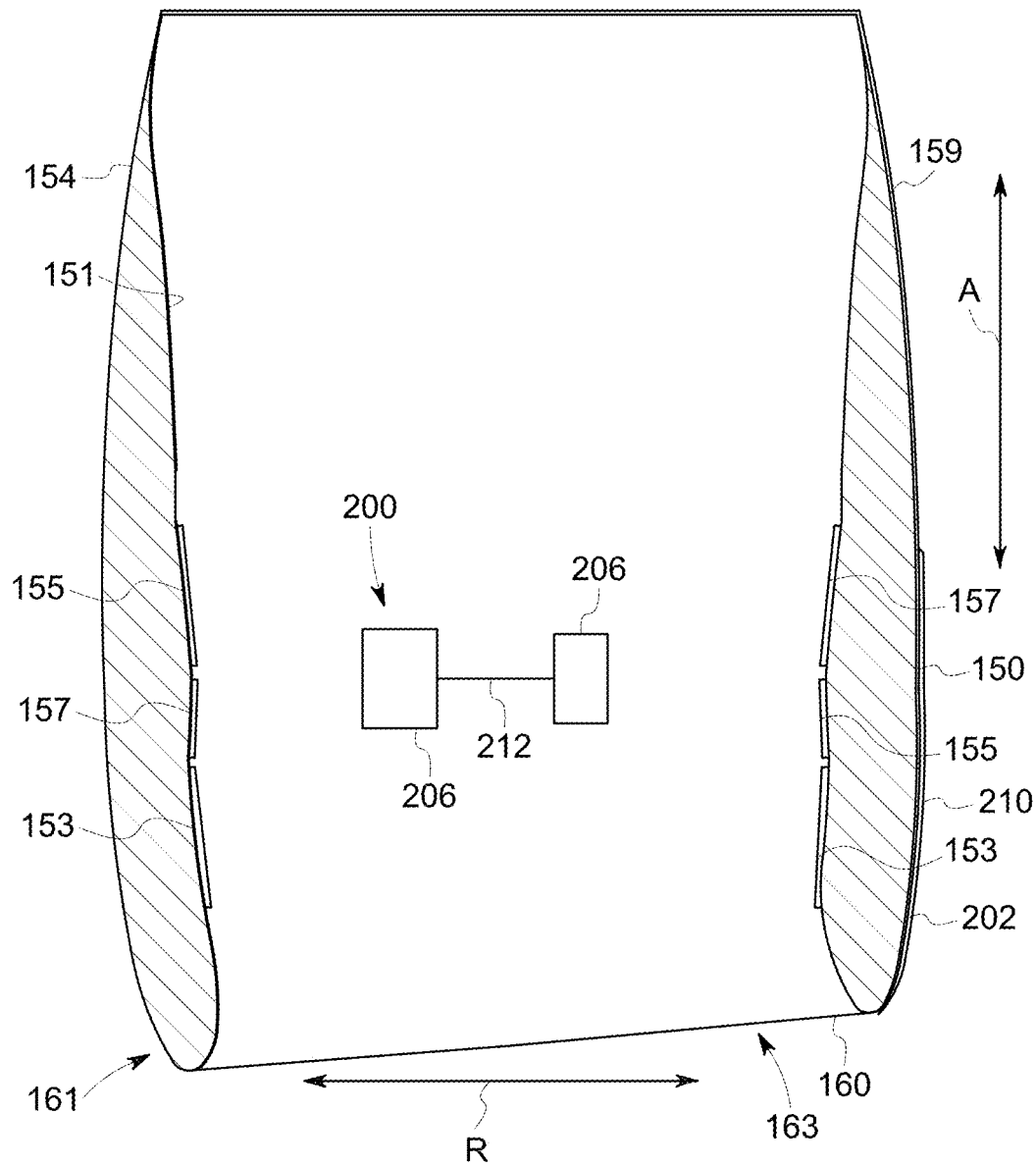
FIG. 4 is a schematic view of an exemplary fan case for use with the exemplary aircraft engine shown in FIG. 1 with the fan case and the detection system in a fourth detection configuration.

Whether heater 202 is heat lamp 208 or heating blanket 210 is dependent on the orientation of fan case 150 and the location of the point of inspection. Specifically, fan case 150 may be inspected by detection system 200 in an installed orientation or an uninstalled orientation. When fan case 150 is in the installed orientation, as shown in FIGS. 1 and 2, fan case 150 circumscribes turbofan engine 110. When fan case 150 is in the uninstalled orientation, as shown in FIGS. 3 and 4, fan case 150 does not circumscribe turbofan engine 110.

Additionally, fan case 150 includes an upper portion 161 and a lower portion 163. Relative to the direction of gravity in the installed orientation, upper portion 161 is the top half of fan case 150, and lower portion 163 is the bottom half of fan case 150. If water is entrained between fan case 150 and liners 153, 155, and 157 in upper portion 161, gravity generally causes the water to accumulate on liners 153, 155, and 157 rather than fan case 150. Conversely, if water is entrained between fan case 150 and liners 153, 155, and 157 in lower portion 163, gravity generally causes the water to accumulate on fan case 150 rather than liners 153, 155, and 157. When inspecting upper portion 161, the entrained water may contact liners 153, 155, and 157, not fan case 150. As such, the entrained water will absorb more heat and will be easier to detect by heating inner radial surface 151. As shown in FIG. 1, heat lamp 208 is used to heat inner radial surface 151. When inspecting lower portion 163, the entrained water may contact fan case 150, not liners 153, 155, and 157. As such, the entrained water will absorb more heat and will be easier to detect by heating outer radial surface 159. As shown in FIG. 2, heating blanket 210 is used to heat outer radial surface 159.

Accordingly, fan case 150 and detection system 200 may be configured in four detection configurations. In a first detection configuration, shown in FIG. 1, fan case 150 is in the installed orientation and heat lamp 208 is positioned to heat inner radial surface 151. In a second detection configuration, shown in FIG. 2, fan case 150 is in the installed orientation and heating blanket 210 is positioned to heat outer radial surface 159. In a third detection configuration, shown in FIG. 3, fan case 150 is in the uninstalled orientation and heat lamp 208 is positioned to heat inner radial surface 151. In a fourth detection configuration, shown in FIG. 4, fan case 150 is in the uninstalled orientation and heating blanket 210 is positioned to heat outer radial surface 159.

In the exemplary embodiment, monitoring camera 204 is an infrared camera configured to detect the local transient thermal gradient caused by heater 202. Monitoring camera 204 is positioned proximate to fan case 150 and liners 153, 155, and 157 and is configured to record images and/or video of fan case 150 and liners 153, 155, and 157. Monitoring camera 204 is configured to send the recorded images and/or video to computing device 206 for analysis. Monitoring camera 204 may be any type of detection device that enables detection system 200 to operate as described herein. In the exemplary embodiment, because the local transient thermal gradients dissipate quickly and are small thermal gradients, monitoring camera 204 is configured to detect temperature differences of less than one hundredth of a degree on the Kelvin scale. As such, heater 202 only has to create a small local transient thermal gradient between fan case 150 and liners 153, 155, and 157 and the entrained water for monitoring camera 204 to detect the local transient thermal gradient. Additionally, a large thermal gradient may damage fan case 150 and/or liners 153, 155, and 157. Specifically, a large thermal gradient may cause damage to liners 153, 155, and 157, debonding of liners 153, 155, and 157, damage to fan case 150, and stress to fan case 150. Accordingly, because monitoring camera 204 can detect small local transient thermal gradients and a large thermal gradient may cause damage to fan case 150 and/or liners 153, 155, and 157, heater 202 only has to create a small local transient thermal gradient between fan case 150 and liners 153, 155, and 157. In the exemplary embodiment, the temperature difference between a heated portion of fan case 150 and liners 153, 155, and 157 and a non-heated portion of fan case 150 and liners 153, 155, and 157 is less about 20° C. Additionally, if the temperature of the entrained water meets or exceeds 100° C., the boil point of water, the boiling entrained water may cause damage to fan case 150 and/or liners 153, 155, and 157. Accordingly, heater 202 is configured to raise the heat fan case 150 and liners 153, 155, and 157 such that the temperature of the entrained water does not meet or exceed 100° C. Specifically, in the exemplary embodiment, heat lamp 208 may be positioned about one foot away from inner radial surface 151 for about three to five seconds in order to create a detectable local transient thermal gradient. However, heat lamp 208 may be positioned any distance from inner radial surface 151 for any amount of time that enables detection system 200 to operate as described herein. Because fan case 150 conducts heat and a thickness of fan case 150 delays thermal energy from heating blanket 210 from being absorbed by the entrained water, heating blanket 210 may apply heat to outer radial surface 159 for about three to five minutes in order to create a detectable local transient thermal gradient. However, heating blanket 210 may apply heat to outer radial surface 159 for any amount of time that enables detection system 200 to operate as described herein. Monitoring camera 204 is positioned to image inner radial surface 151 in all four detection configurations.

Monitoring camera 204 detects differences in the emission of IR radiation from fan case 150 and/or liners 153, 155, and 157 with and without entrained water. For example, a region of fan case 150 that contains entrained water will absorb heat from heater 202 at a different rate than a region of fan case 150 that does not contain entrained water. Fan case 150 and/or liners 153, 155, and 157 are heated directly by heater 202, and entrained water is also heated by heater 202. Additionally, the heat entrained water also heats fan case 150 and/or liners 153, 155, and 157. As such, the entrained water improves heat transfer from heater 202 to fan case 150 and/or liners 153, 155, and 157. The heated fan case 150 and/or liners 153, 155, and 157 emits infrared radiation. Because the entrained water improves absorption of the heat from heater 202, regions of fan case 150 that contain entrained water will absorb and desorb heat at a faster rate than regions of fan case 150 that do not contain entrained water, creating a local transient thermal gradient, or a gradient of the heating rate with respect to time. As such, regions of fan case 150 that contain entrained water will emit infrared radiation at a high rate as the region is heated by the entrained water. Moreover, the entrained water may also emit infrared radiation as well. Regions of fan case 150 that do not contain entrained water will not absorb heat from heater 202 as efficiently as regions of fan case 150 that contain entrained water, and, as such, less infrared radiation will be emitted from regions of fan case 150 that do not contain entrained water.

Detection system 200 is configured to measure differences in temperature of fan case 150 and/or liners 153, 155, and 157 during heating and/or cooling as a function of position. Specifically, monitoring camera 204 is configured to detect differences in heating and/or cooling rates of the regions of fan case 150 and/or liners 153, 155, and 157 with and without entrained water. More specifically, monitoring camera 204 is configured to detect the gradient of the heating and/or cooling rate with respect to time as a function of position. For example, the heating rate of regions of fan case 150 and/or liners 153, 155, and 157 with entrained water is faster than the heating rate of regions of fan case 150 and/or liners 153, 155, and 157 without entrained water. As discussed above, monitoring camera 204 is very sensitive to small, temporal changes in temperature. Thus, the effect of entrained water on the heating and/or cooling rate can be used to detect the presence of entrained water and the location of the entrained water in fan case 150 and/or liners 153, 155, and 157.

The local transient thermal gradient detected by monitoring camera 204 is dependent on the position of heater 202. For example, when heat lamp 208 is heating inner radial surface 151, entrained water will absorb more heat than surrounding portions of fan case 150 and/or liners 153, 155, and 157. Accordingly, a first area of fan case 150 and/or liners 153, 155, and 157 that contacts the entrained water will have a first transient temperature, and a second area of fan case 150 and/or liners 153, 155, and 157 that does not contact the entrained water will have a second transient temperature higher than the first transient temperature. As such, monitoring camera 204 is configured to detect regions of lower temperature, or cold spots, when heater 202 heats inner radial surface 151. Conversely, when heating blanket 210 is heating outer radial surface 159, entrained water will absorb and conduct more heat from outer radial surface 159 to inner radial surface 151 than surrounding portions of fan case 150 and/or liners 153, 155, and 157. Accordingly, a first area of fan case 150 and/or liners 153, 155, and 157 that contacts the entrained water will have a first transient temperature, and a second area of fan case 150 and/or liners 153, 155, and 157 that does not contact the entrained water will have a second transient temperature lower than the first transient temperature. As such, monitoring camera 204 is configured to detect regions of higher temperature, or hot spots, when heater 202 heats outer radial surface 159.

Computing device 206 includes a computer system that includes at least one processing device (not shown in FIG. 1) and at least one memory device (not shown in FIG. 1) that executes executable instructions to analyze images from monitoring camera 204. Computing device 206 includes, for example, image processing software or other analytic software configured to analyze images and/or video from monitoring camera 204. In the exemplary embodiment, computing device 206 is also configured to operate at least partially as a data acquisition device and to monitor and/or analyze a condition of fan case 150. In one embodiment, for example, computing device 206 receives and processes images from monitoring camera 204. Computing device 206 stores and analyzes the images, which are used to facilitate maintaining and repairing fan case 150. The different detection configurations shown in FIGS. 1-4 are described below in detail.

During detection, turbofan engine 110 is deactivated (i.e., turned off). In FIG. 1, detection system 200 and fan case 150 are configured in the first detection configuration. Specifically, monitoring camera 204 is positioned proximate inner radial surface 151 on upper portion 161 of fan case 150 and is communicatively coupled to computing device 206 by a cable 212. Alternatively, monitoring camera 204 may be communicatively coupled computing device 206 by any method of communication that enables detection system 200 to operate as described herein, include, without limitation, wireless communication. Heat lamp 208 is positioned proximate inner radial surface 151 on upper portion 161 of fan case 150 and activated such that heat lamp 208 directs infrared radiation toward inner radial surface 151 on upper portion 161 of fan case 150. Specifically, heat lamp 208 heats inner radial surface 151 on upper portion 161 of fan case 150 such that local temperature gradients are created where entrained water is present. Monitoring camera 204 acquires a plurality of images and/or video of inner radial surface 151 on upper portion 161 of fan case 150 and sends the images and/or video to computing device 206. Computing device 206 analyzes the images and/or video to determine and detect the presence of entrained water between fan case 150 and liners 153, 155, and 157. If appropriate, computing device 206 then sends a notification to an operator that entrained water may be present.

In FIG. 2, detection system 200 and fan case 150 are configured in the second detection configuration. Specifically, monitoring camera 204 is positioned proximate inner radial surface 151 on lower portion 163 of fan case 150 and is communicatively coupled to computing device 206 by cable 212. Heating blanket 210 is positioned on outer radial surface 159 on lower portion 163 of fan case 150 and activated such that heating blanket 210 directs infrared radiation toward outer radial surface 159 on lower portion 163 of fan case 150. Specifically, heating blanket 210 heats outer radial surface 159 on lower portion 163 of fan case 150 such that local temperature gradients are created on inner radial surface 151 where entrained water is present. Monitoring camera 204 acquires a plurality of images and/or video of inner radial surface 151 on lower portion 163 of fan case 150 and sends the images and/or video to computing device 206. Computing device 206 analyzes the images and/or video to detect the presence of entrained water between fan case 150 and liners 153, 155, and 157. If appropriate, computing device 206 then sends a notification to the operator that entrained water may be present.

FIG. 3 is a schematic cross-sectional view of fan case 150 and detection system 200 in a third detection configuration. FIG. 4 is a schematic cross-sectional view of fan case 150 and detection system 200 in a fourth detection configuration. Fan case 150 is illustrated in an uninstalled orientation in FIGS. 3 and 4. Specifically, fan case 150 does not circumscribe turbofan engine 110 and is oriented such that inlet 160 of fan case 150 faces downward (relative to the direction of gravity). Gravity causes entrained water to physically contact both fan case 150 and liners 153, 155, and 157. As such, both heat lamp 208 and heating blanket 210 may be used by detection system 200 to detect entrained water.

During detection, as shown in FIG. 3, fan case 150 is removed from turbofan engine 110 and placed in an uninstalled orientation. Further, monitoring camera 204 is positioned proximate inner radial surface 151 of fan case 150 and is communicatively coupled to computing device 206 by cable 212. Heat lamp 208 is positioned proximate inner radial surface 151 of fan case 150 and activated such that heat lamp 208 directs infrared radiation toward inner radial surface 151 of fan case 150. Heat lamp 208 heats inner radial surface 151 of fan case 150 such that local temperature gradients are created where entrained water is present. Monitoring camera 204 acquires a plurality of images and/or video of inner radial surface 151 of fan case 150 and sends the images and/or video to computing device 206. Computing device 206 analyzes the images and/or video to determine and detect the presence of entrained water between fan case 150 and liners 153, 155, and 157. If appropriate, computing device 206 then sends a notification to the operator that entrained water may be present.

In FIG. 4, fan case 150 is also removed from turbofan engine 110 and placed in the uninstalled orientation. Hence, in the fourth detection configuration, monitoring camera 204 is positioned on inner radial surface 151 of fan case 150 and is communicatively coupled to computing device 206 by cable 212. Heating blanket 210 is positioned proximate outer radial surface 159 of fan case 150 and activated such that heating blanket 210 directs infrared radiation toward outer radial surface 159 of fan case 150. Specifically, heating blanket 210 heats outer radial surface 159 of fan case 150 such that local temperature gradients are created on inner radial surface 151 where entrained water is present. Monitoring camera 204 acquires a plurality of images and/or video of inner radial surface 151 of fan case 150 and sends the images and/or video to computing device 206. Computing device 206 analyzes the images and/or video to determine and detect the presence of entrained water between fan case 150 and liners 153, 155, and 157. If appropriate, computing device 206 then sends a notification to the operator that entrained water may be present.

Figure 5:
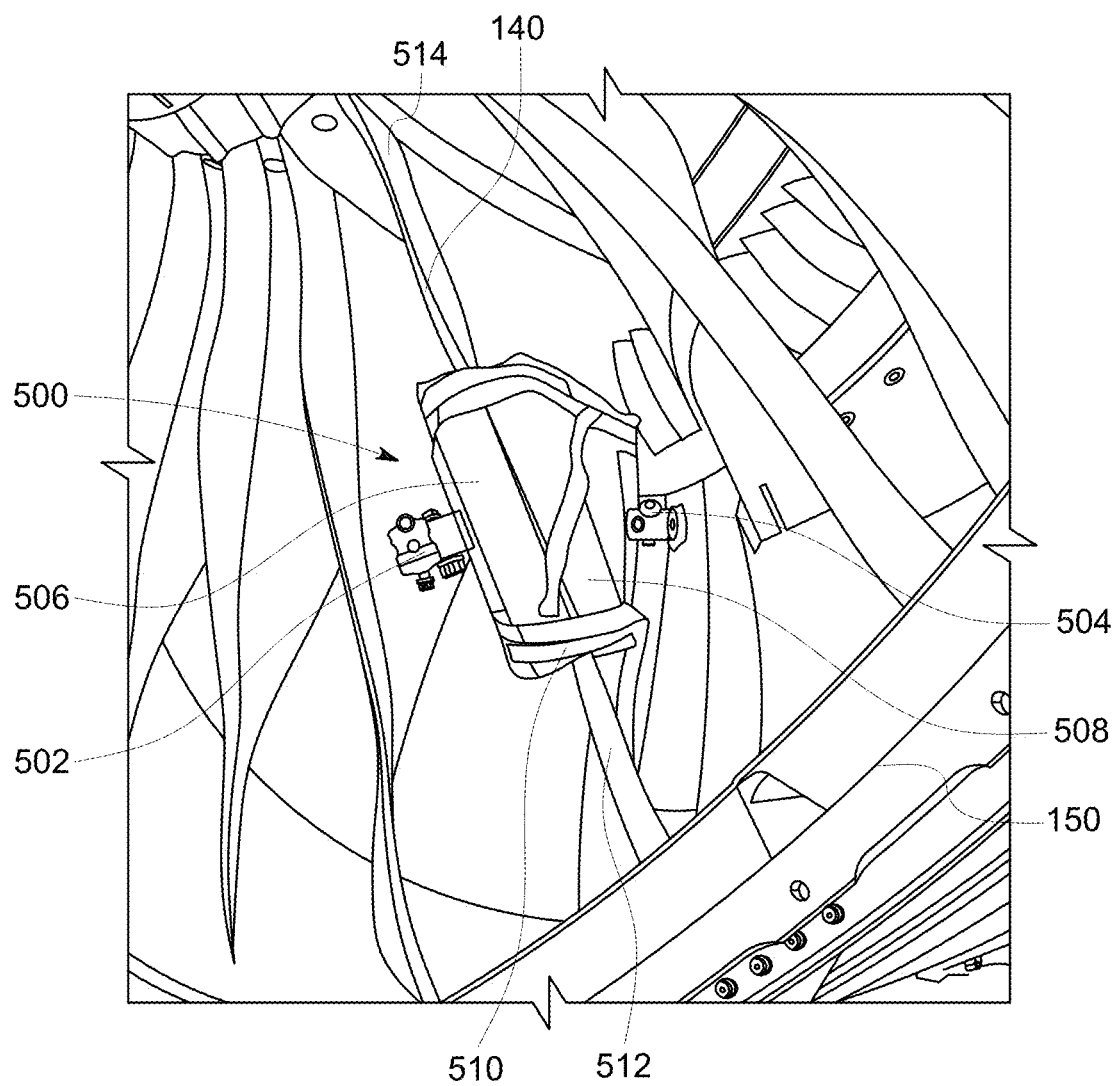
FIG. 5 is a perspective view of an exemplary monitoring camera system installed on an exemplary fan blade for use with the exemplary aircraft engine shown in FIG. 1.

FIG. 5 is a perspective view of a monitoring camera system 500 installed on fan blades 140 that can be used with the detection configuration described above. In the exemplary embodiment, monitoring camera system 500 is installed after turbo fan engine 100 is deactivated and includes a first monitoring camera 502, a second monitoring camera 504, a first cushion 506, a second cushion 508, and a plurality of straps 510. First monitoring camera 502 and first cushion 506 are positioned on a first side 512 of fan blade 140, and second monitoring camera 504 and second cushion 508 are positioned on a second side 514 of fan blade 140. Straps 510 are configured to secure first monitoring camera 502, second monitoring camera 504, first cushion 506, and second cushion 508 to fan blade 140. First and second cushions 506 and 508 are configured to protect fan blade 140 from first and second monitoring cameras 502 and 504. First monitoring camera 502 is configured to image liners 153 and 157 forward of fan blades 140, and second monitoring camera 504 is configured to image liners 155 and 157 aft of fan blades 140. Fan blades 140 can be rotated to enable monitoring camera system 500 to image an entire inner circumference of inner radial surface 151. Because monitoring camera system 500 is installed on fan blades 140, monitoring camera system 500 can only be used when fan case 150 is in the installed orientation.

In some embodiments, detection system 200 may not include heater 202. Rather, monitoring camera 204 and/or monitoring camera system 500 is used to image fan case 150 a predetermined amount of time after turbofan engine 110 is deactivated. Turbofan engine 110 generates heat during operations and entrained water may absorb the infrared radiation, creating local temperature gradients on inner radial surface 151 where entrained water is present without requiring heater 202. However, the local temperature gradients on inner radial surface 151 will disappear once the heat absorbed by fan case 150 dissipates. As such, the predetermined amount of time shall be short enough that the local temperature gradient is still detectable by monitoring camera 204 and/or monitoring camera system 500.

Figure 6:
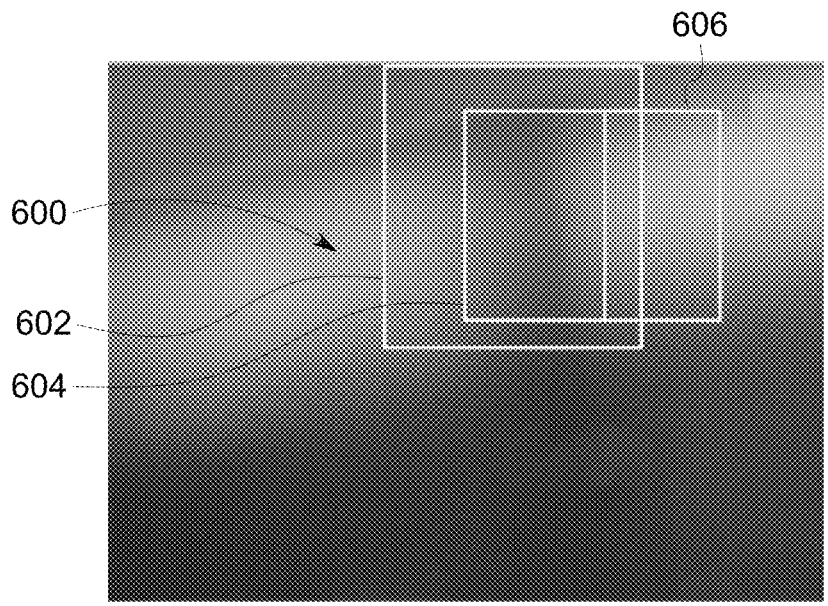
FIG. 6 is a thermal image of a surface of the exemplary fan case of the aircraft engine shown in FIG. 1 acquired by the detection system.

FIG. 6 is an exemplary image 600 acquired by monitoring camera 204 and/or monitoring camera system 500 of fan case 150 and/or liners 153, 155, and 157. In the exemplary embodiment, image 600 is a gray scale image of fan case 150 and/or liners 153, 155, and 157. Darker regions in image 600 indicate regions with lower temperatures, or cold spots, and lighter regions in image 600 indicate regions with higher temperatures, or hot spots. As such, monitoring camera 204 and/or monitoring camera system 500 facilitate differentiating regions of higher temperature from regions of lower temperature by showing dark regions and light regions on image 600. Then, computing device 206 can detect dark regions and/or light regions and segments the detected regions into a region of interest (ROI) 602. In the exemplary embodiment, ROI 602 is a rectangular region within image 600 that demarcates a dark region and/or a light region.

While ROI 602 is shown as a rectangular region in image 600, ROI 602 may alternatively have any shape that enables detection system 200 to operate as described herein. Specifically, the shape of ROI 602 can be any shape that allows detection system 200 to detect local temperature gradients on inner radial surface 151 under liners 153, 155, and 157. For example, rather than a rectangle, ROI 602 may be a circle.

Monitoring camera 204 and/or monitoring camera system 500 sends images 600 to computing device 206 to be analyzed. Computing device 206 includes image processing software configured to analyze images and/or video from monitoring camera 204 and/or monitoring camera system 500. Specifically, the image processing software analyzes image 600 to detect light regions and dark regions. The image processing software then demarcates a light and/or dark region that may indicate the presence of entrained water by using ROI 602. Computing device 206 then sends image 600 with ROI 602 to an operator for further analysis to determine if water is actually entrained within the region. In the exemplary embodiment, the image processing software includes image processing tools, such as segmentation, auto thresholding, local thresholding, and histogram equalization to visualize regions of entrained water, and signal processing tools to extract quantitative information about the amount of entrained water present in fan case 150 and/or liners 153, 155, and 157. Additionally, in the same embodiments, computing device 206 and/or monitoring camera 204 may include a position tracking device (not shown) configured to track where each image 600 was acquired on inner radial surface 151 of fan case 150.

Computing device 206 may also use analytic software to develop models that predict the probability of entrained water based on the local transient thermal gradient detected. Specifically, computing device 206 may be configured to determine a volume of water within fan case 150 based on the plurality of images and/or video of inner radial surface 151 of fan case 150. For example, a higher contrast between first area 604 and second area 606 may indicate a greater volume of entrained water. Additionally, monitoring camera 204 may send videos of ROI 602 rather than single images. The videos may show how the local temperature gradient between first area 604 and second area 606 changes over time, and computing device 206 may use analytic software to develop models that predict the volume of entrained water based on the change in the temperature gradient over time.

In an alternative embodiment, computing device 206 does not automatically place ROI 602 around light and/or dark regions. Rather, the operator examines each image or video and manually indicates whether a light and/or dark region is in a ROI 602.

Figure 7:
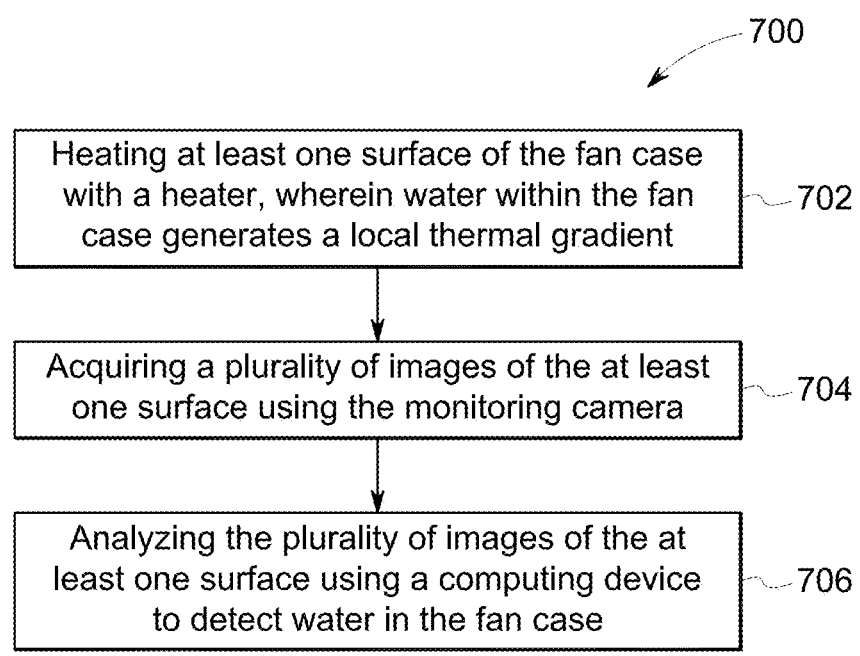
FIG. 7 is a flow diagram of a method of detecting water in a fan case shown in FIG. 1.

FIG. 7 is a flow diagram of a method 700 of detecting water in a fan case. Method 700 includes heating 702 at least one surface of the fan case with a heater. Method 700 also includes acquiring 704 a plurality of images of the at least one surface using a monitoring camera. Method 700 further includes analyzing 706 the plurality of images of the at least one surface using a computing device to detect water in the fan case.

In a first example of a method of detecting water in fan case 150 using detection system 200, fan case 150 and detection system 200 were arranged in the second detection configuration, where fan case 150 was in the installed orientation and heating blanket 210 was positioned to heat outer radial surface 159. Monitoring camera system 500 was positioned to acquire images of liners 153, 155, and 157 and fan case 150. Specifically, monitoring camera system 500 was positioned as shown in FIG. 5 to be rotated within fan case 150. Heating blanket 210 heated fan case 150 for 2 minutes and raised the temperature of fan case 150 10 Celsius (° C.) above the ambient temperature, and thereby increasing the infrared emission from fan case 150. Monitoring camera system 500 was rotated within fan case 150 and acquired image 600 of fan case 150 and/or liners 153, 155, and 157 as shown in FIG. 6. Computing device 206 used analytic software and predicted the probability of entrained water based on the local transient thermal gradient detected within image 600 as described above.

In a second example of a method of detecting water in fan case 150 using detection system 200, fan case 150 and detection system 200 were arranged in the first detection configuration, where fan case 150 was in the installed orientation and heater 202 was positioned to heat liners 153, 155, and 157 and fan case 150 on inner radial surface 151 of fan case 150. Specifically, first, heater 202 heated a portion of liners 153, 155, and 157 and fan case 150. Heater 202 heated fan case 150 for approximately 5 to 10 seconds and raised the temperature of fan case 150 10° C. above the ambient temperature, and thereby increasing the infrared emission from fan case 150. Then, monitoring camera system 500 was positioned to acquire images of the heated portion of liners 153, 155, and 157 and fan case 150. Specifically, monitoring camera system 500 was positioned as shown in FIG. 5 to be rotated within fan case 150, and monitoring camera system 500 was rotated to acquire images of the heated portion of liners 153, 155, and 157 and fan case 150. Monitoring camera system 500 acquired image 600 of fan case 150 and/or liners 153, 155, and 157 as shown in FIG. 6. Computing device 206 used analytic software and predicted the probability of entrained water based on the local transient thermal gradient detected within image 600 as described above.

Embodiments of detection systems described herein detect water entrained within a fan case of a gas turbine engine. The fan case includes a plurality of liners on an inner surface of the fan case. During operations, water from the ambient air may penetrate between the liners and the fan case and entrain water behind the liners. The water may include corroding species, such as salt, and may eventually cause corrosion within the fan case. The detection system is configured to detect the entrained water without requiring removing the liners. The detection system includes a heater, a monitoring camera, and a computing device. The heater is configured to heat the fan case such that a local temperature gradient is created. Specifically, because water absorbs heat at a different rate than the fan case, a local temperature gradient is created where the water is entrained behind the liners. The monitoring camera is an infrared camera configured to image the liners and/or the fan case. The monitoring camera acquires a plurality of images of an inner radial surface of the fan case, and the local temperature gradients appear as light or dark spots on the images. The images are sent to the computing device where image processing software analyzes the images to determine if water is entrained behind the liners. The computing device then alerts the operator to the potential presence of entrained water. The detection system reduces inspection costs by detecting entrained water without removing the liners from the fan case and/or the fan case from the engine. As such, the labor cost of inspecting the fan case is reduced by using the detection system to detect water rather than removing the liners from the fan case. Additionally, the detection system also reduces operating costs of the gas turbine engine by reducing downtime because the fan case and the liners are not removed from the engine.

An exemplary technical effect of the methods and systems described herein includes: (a) imaging a fan case; (b) analyzing the images of the fan case to detect a local transient thermal gradient on the fan case; and (c) alerting an operator of potential entrained water within the fan case based on the detected local transient thermal gradient.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

Exemplary embodiments of detection systems having monitoring cameras are described above in detail. The apparatus, systems, and methods are not limited to the specific embodiments described herein, but rather, operations of the methods and components of the systems may be utilized independently and separately from other operations or components described herein. For example, the systems, methods, and apparatus described herein may have other industrial or consumer applications and are not limited to practice with detection systems as described herein. Rather, one or more embodiments may be implemented and utilized in connection with other industries.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A detection system configured to detect water in a fan case, said detection system comprising:
    a heater configured to apply heat to the fan case, wherein any water within the fan case generates a local transient thermal gradient in response to the applied heat;
    a monitoring camera positioned proximate the fan case and configured to acquire a plurality of images of the heated fan case; and
    a computing device configured to:
    receive the plurality of images from said monitoring camera; and
    analyze the plurality of images to detect the water in the fan case.

2. The detection system in accordance with claim 1, wherein said monitoring camera comprises an infrared camera.

3. The detection system in accordance with claim 1, wherein said heater comprises a heat lamp.

4. The detection system in accordance with claim 3, wherein said heat lamp is configured to heat an inner radial surface of said fan case.

5. The detection system in accordance with claim 1, wherein said heater comprises a heating blanket.

6. The detection system in accordance with claim 5, wherein said heating blanket is configured to heat an outer radial surface of said fan case.

7. The detection system in accordance with claim 6, wherein said heating blanket is applied to said outer radial surface of said fan case.

8. The detection system in accordance with claim 1, wherein said monitoring camera is positioned to acquire a plurality of images of an inner radial surface of said fan case.

9. A detection system configured to detect water in a fan case of a gas turbine engine, the gas turbine engine including a plurality of fan blades and the fan case circumscribing the plurality of fan blades, said detection system comprising:
    a heater configured to apply heat to the fan case, wherein any water within the fan case generates a local transient thermal gradient in response to the applied heat;
    a monitoring camera system is attached to a fan blade of the plurality of fan blades and configured to acquire a plurality of images of the heated fan case; and
    a computing device configured to:
    receive the plurality of images from said monitoring camera; and
    analyze the plurality of images to detect the water in the fan case.

10. The detection system in accordance with claim 9, wherein said monitoring camera system comprises a first monitoring camera and a second monitoring camera, wherein said first monitoring camera is attached to a first side of a fan blade of the plurality of fan blades, and wherein said second monitoring camera is attached to a second side of the fan blade of the plurality of fan blades.

11. The detection system in accordance with claim 10, wherein said first monitoring camera is configured to image portions of the fan case forward of the plurality of fan blades, and wherein said second monitoring camera is configured to image portions of the fan case aft of the plurality of fan blades.

12. The detection system in accordance with claim 10, wherein said monitoring camera system further comprises a first cushion and a second cushion, wherein said first cushion is positioned between said first monitoring camera and the fan blade, and wherein said second cushion is positioned between said second monitoring camera and the fan blade.

13. The detection system in accordance with claim 9, wherein said monitoring camera system comprises a plurality of straps attaching said monitoring camera system to the fan blade.

14. The detection system in accordance with claim 9, wherein said monitoring camera system is configured to acquire the plurality of images of the fan case by rotating the fan blade.

15. The detection system in accordance with claim 14, wherein said monitoring camera system is configured to acquire the plurality of images of an inner radial surface of said fan case by rotating the fan blade.

16. The detection system in accordance with claim 9, wherein said monitoring camera system comprise at least one infrared camera.

17. A method of detecting water in a fan case, said method comprising:
   heating at least one surface of the fan case with a heater, wherein any water within the fan case generates a local transient thermal gradient in response to the applied heat;
   acquiring a plurality of images of the at least one surface using a monitoring camera; and
   analyzing the plurality of images of the at least one surface using a computing device to detect water in the fan case.

18. The method of claim 17, wherein analyzing the plurality of images comprises identifying at least one of a light region and a dark region in a least one of the plurality of images.

19. The method of claim 17, wherein analyzing the plurality of images comprises identifying at least one region of interest in a least one of the plurality of images.

20. The method of claim 17, further comprising determining a volume of water within the fan case based on the plurality of images.

* * * * *

UNITED STATES PATENT AND TRADEMARK OFFICE
CERTIFICATE OF CORRECTION

| | | |
|---|---|---|
| PATENT NO. | : 11,474,058 B2 | Page 1 of 1 |
| APPLICATION NO. | : 16/244962 | |
| DATED | : October 18, 2022 | |
| INVENTOR(S) | : Nalladega et al. | |

It is certified that error appears in the above-identified patent and that said Letters Patent is hereby corrected as shown below:

In the Claims

In Column 17, Claim 18, Line 17, delete "a least" and insert -- at least --, therefor.

In Column 17, Claim 19, Line 21, delete "a least" and insert -- at least --, therefor.

Signed and Sealed this
Seventeenth Day of January, 2023

Katherine Kelly Vidal
*Director of the United States Patent and Trademark Office*